United States Patent [19]

Brown et al.

[11] Patent Number: 4,951,338
[45] Date of Patent: Aug. 28, 1990

[54] MACHINE FOR PERFORMING A PROGRESSIVE OPERATION ON MARGINAL PORTIONS OF A SHOE IN THE MANUFACTURE THEREOF

[75] Inventors: Terence J. Brown, Wigston; John Davies, Syston, both of England

[73] Assignee: British United Shoe Machinery, Ltd., Leicester, England

[21] Appl. No.: 377,237

[22] Filed: Jul. 7, 1989

[30] Foreign Application Priority Data

Jul. 20, 1988 [GB] United Kingdom ............... 8816985
Sep. 12, 1988 [GB] United Kingdom ............... 8821333

[51] Int. Cl.$^5$ .......................... A43D 95/00; C14B 1/44
[52] U.S. Cl. .......................................... 12/77; 69/6.5
[58] Field of Search ............... 12/77, 78, 1 R, 1 A, 12/12.4, 12.5; 69/6.5

[56] References Cited

U.S. PATENT DOCUMENTS

| | | | |
|---|---|---|---|
| 3,932,907 | 1/1976 | Vornberger | 12/77 |
| 4,561,139 | 12/1985 | Becka et al. | 69/6.5 |
| 4,649,585 | 3/1987 | Petrzelka et al. | 12/77 |
| 4,653,133 | 3/1987 | Gebel | 12/12.4 |
| 4,654,914 | 4/1987 | Legper | 12/12.5 |
| 4,756,038 | 7/1988 | Stein | 12/77 |
| 4,866,802 | 9/1989 | Stein et al. | 12/1 R |

FOREIGN PATENT DOCUMENTS 0093645 1/1982 European Pat. Off. .
0276944 8/1988 European Pat. Off. .

Primary Examiner—Steven N. Meyers

[57] ABSTRACT

Two embodiments of the invention are described, namely a machine for performing an adhesive-applying operation progressively along marginal portions of the bottoms of lasted shoes and a machine for performing a roughing operation progressively along side wall portions of lasted shoes, each machine comprising a tool holder (670) for supporting a tool (20) for operating along three axes (X-, Y- and Z-axes) upon a workpiece surface, e.g. marginal portions of a shoe bottom. In addition the tool holder (670) is capable of pivoting in two directions, widthwise and lengthwise of the shoe bottom, about a point (P), but without displacement of said point in relation to the shoe support by reason of such pivotal movement. The movement along the various axes and the pivotal movement are all controlled by n.c. motors, e.g. stepping motors ((84), (144), (122), 698, 700), and operator-actuatable means is provided for enabling the path of such tool, including such pivotal movement, to the digitized under operator control.

28 Claims, 5 Drawing Sheets

MACHINE FOR PERFORMING A PROGRESSIVE OPERATION ON MARGINAL PORTIONS OF A SHOE IN THE MANUFACTURE THEREOF

BACKGROUND OF THE INVENTION

This invention is concerned with a machine for performing a progressive operation on marginal portions of a shoe in the manufacture thereof comprising a shoe support for supporting a lasted shoe such that the shoe bottom is positioned in a desired relationship with a height datum of the machine, a tool support arrangement by which a tool holder is supported for pivotal movement about a first axis extending transversely of the bottom of a shoe supported by a shoe support, first drive means for effecting relative movement between the shoe support and the tool holder in directions extending lengthwise and transversely of the bottom of a shoe supported by the shoe support, whereby a tool supported by the tool holder can be caused to follow the plan contour of such shoe bottom, second drive means for effecting relative movement between the shoe support and the tool holder in a direction extending heightwise of the shoe bottom and thus for varying the relationship between a tool supported by said holder and said height datum whereby, as relative lengthwise and transverse movement takes place as aforesaid between the shoe support and the tool support arrangement, such tool can be caused to follow the height contour of the shoe bottom, and third drive means for effecting pivotal movement of the tool holder about said first axis to maintain an operating surface portion of a tool supported thereby in a desired angular relationship with the surface of the shoe bottom as such tool is caused to follow the plan and height contours thereof as aforesaid.

One such machine, for performing a roughing operation on marginal portions of shoe bottoms, is disclosed in EP-A0091321, while a similar machine, but for the progressive application of adhesive to marginal portions of shoe bottoms is disclosed in EP-A0276944.

In the operation of the former of these two machines the roughing tool is a radial wire brush which essentially lies in a plane extending heightwise of the marginal portions of the shoe bottom being roughed thereby, the arrangement being that this plane can be tilted, about the axis extending transversely of the shoe bottom, in order to maintain it normal, or substantially normal, in a direction extending transversely of the shoe bottom, to the portion of the surface of the shoe bottom at the region of engagement of the tool with the shoe.

In the latter machine referred to above, on the other hand, the adhesive-applying tool is constituted by a rotary brush of the "end mill" type, said brush surrounding a nozzle outlet through which adhesive is supplied, and the arrangement being such that, as the tool is caused to operate progressively along the shoe bottom, the rotating brush serves to spread the adhesive, giving a clearly defined edge adjacent the edge of the shoe bottom. The machine thus operates satisfactorily, especially on shoes having relatively low heels, but it has been found that, in the case of shoes the bottoms of which have pronounced contours in directions extending lengthwise and/or widthwise of the shoe, it is desirable to maintain the axis of rotation of the brush normal or substantially so to the portion of the shoe bottom upon which the tool is operating at any given time.

In addition to the two operations referred to above to be performed upon marginal portions of shoe bottoms, in some shoe constructions outsoles are used which incorporate an upstanding wall which is to be secured to side wall portions of the shoe, which portions thus in this case will require similar preparation treatment to shoe bottoms, or alternatively a shoe bottom unit may be directly moulded-on to the bottom of the lasted shoe in a injection-moulding process, again for which purpose at least side wall roughing and possibly the application of a primer or adhesive is again desirable. Customarily for carrying out such side wall treatment operations the shoe is presented manually by an operator to appropriate tools, but this is of course labour-intensive and time-consuming, and furthermore the quality of the operation is dependent upon the skill of the operator. Bearing in mind that, if the roughing operation or the primer or adhesive application extends beyond the region to which the sole unit is to be attached, the finished shoe will have an unsightly appearance, the skill of the operator in this case is of great importance.

There have therefore been proposals for rendering automatic the operation of side wall roughing, in particular using a commercially available, general purpose, robot device. Such devices are of course known comprising five or more axes by which a tool supported by a tool holder can be caused to operate upon a surface portion of a workpiece held by a work support, in such a manner that the contour in various directions of the surface is accommodated, while a given axis of the tool is maintained at a desired angular disposition in relation to the surface. In general, robot devices are so arranged as to emulate human configurations, and consequently it is customary to refer to wrists, elbows and the like to represent the various axes about which an articulated robot arm will operate. In adapting such a robot device for example for supporting a roughing tool for performing a progressive roughing operation on side wall portions of a shoe, however, it has to be borne in mind that customarily it is possible to "grade" the path of such a tool by reference to the overall length of the shoe, the various sizes of shoe in a given style customarily being graded according to known rules. Grading is of course possible using a multi-axis robot device, but in general such grading will require a good deal of computing, since modifications to the movement along one axis will invariably affect the other "downstream" axes, so that rather than perform a grading operation it may be preferable merely to teach each size and store the information. Such an approach will of course require a good deal more memory than where grading is possible.

For the same reasons, a general purpose robot device is unlikely to be satisfactory for use with an adhesive-applying operation to be performed upon marginal portions of the bottoms of a range of sizes of shoes.

OBJECT OF THE PRESENT INVENTION

It is thus the object of the present invention to provide an improved machine for performing a progressive operation on marginal portions of a shoe in the manufacture thereof, which machine has a simplified arrangement of axes which avoid the disadvantages referred to above found in robot devices, especially in terms of the effect on other axes of varying the amount of movement along one axis, and which machine is readily adaptable to a variety of tasks associated with progressive operations on marginal portions of shoes, especially, but not exclusively, in relation to marginal portions of shoe bottoms and side wall portions of shoes.

SUMMARY OF THE INVENTION

This object is resolved in accordance with the present invention, in a machine as set out in the first paragraph above, in that the tool support arrangement supports the tool holder for pivotal movement also about a second axis extending perpendicularly to the first axis lengthwise of the shoe bottom, in that the holder supports a tool in such a manner that the point of intersection of the axes lies on a longitudinal centre line of the tool, and a plane in which an operating surface portion of the tool lies extends perpendicularly to the longitudinal centre line of the tool and passes through said point of intersection and is not displaced therefrom when pivotal movement of the tool holder takes place about either of said axes, and in that fourth drive means is provided for effecting pivotal movement of the tool holder about the second axis, the third and fourth drive means being effective, as a tool supported by the tool holder is caused to follow the plan and height contours of the shoe bottom as aforesaid, to cause the longitudinal centre line thereof to be maintained coincident with or parallel to a line extending normally or substantially normally, in directions both lengthwise and transversely of the shoe bottom, to the portion of the surface of the shoe bottom at or laterally adjacent the region of engagement of the tool with the shoe.

By arranging the tool holder for pivotal movement about two mutually perpendicular, intersecting, axes which lie on the longitudinal centre line of the tool, it will be appreciated that the disadvantages of conventional general purpose robot devices as referred to above can be avoided insofar as these two axes are concerned. Furthermore, by so arranging the plane in which the operating surface portion of the tool lies perpendicular to the longitudinal centre line of the tool and so as to pass through the point of intersection of the axes, thus ensuring that said plane is not displaced from the point of intersection when pivotal movement of the tool holder takes place, the point of intersection becomes effectively a point of reference for the relative movement between the tool and the work support along the other three coordinate axes referred to. In this way, a simplified arrangement is achieved which is versatile and flexible, especially from the point of view of e.g. grading, as discussed above.

The particular arrangement described above has been found especially useful firstly for performing an operation, e.g. an adhesive-applying operation, progressively along marginal portions of the bottoms of lasted shoes. In this case the machine, which is generally of the type referred to in the first paragraph above, is characterised in that the tool support arrangement supports the tool holder for pivotal movement about a second axis extending perpendicularly to the first axis lengthwise of the shoe bottom, in that the holder supports a tool comprising a portion mounted for rotation about an axis extending heightwise of the bottom of a shoe supported by the shoe support, in that the first and second axes intersect each other at a point which lies on the axis of rotation of the tool portion, whereby, with an operating surface portion of the tool disposed at said point, said surface portion is not displaced from said point when pivotal movement of the tool holder is effected about either of said axes, and in that fourth drive means is provided for effecting pivotal movement of the tool holder about the second axis, the third and fourth drive means being effective, as a tool supported by the tool holder is caused to follow the plan and height contours of the shoe bottom as aforesaid, to cause the axis of rotation of the tool portion to extend normally or substantially normally, in directions both lengthwise and transversely of the shoe bottom, to the portion of the surface of the shoe bottom at the region of engagement of the operating surface portion of the tool with said surface of the shoe bottom.

It will be appreciated that, using such a machine, a tool supported by the tool support can thus be caused to track along marginal portions of the shoe bottom with its axis of rotation maintained normal, or substantially so, to the portion of shoe bottom upon which it is operating at any given time, in directions both lengthwise and widthwise of the shoe bottom.

It will of course be appreciated that in operating upon shoes, it is not possible to ensure that all shoe bottoms will be the same as one another, or indeed the same as the model size which will previously have been used for digitising in compiling the programmed instruction. Consequently, desirably the tool is mounted in the holder for sliding movement in a direction extending along its axis of rotation such that its operating surface portion is capable of taking up a position along said axis of rotation at either side of the point of intersection of said first and second axes in order to accommodate to irregularities in the shoe bottom. More particularly, it is desirable, in a teaching mode of the machine, to ensure that the tool is at or near the point of intersection of said first and second axes for each digitised point, thus to ensure that the tool can "float" in both plus and minus directions according to any irregularities in the bottom of a shoe which is being operated upon in an operating mode.

The above-described embodiment of the machine has been found especially suitable for use in adhesive-applying operations, and to this end conveniently the tool comprises an adhesive applicator device comprising a nozzle having an outlet disposed at the point of intersection of the first and second axes, and the portion thereof mounted for rotation comprises a brush assembly surrounding the nozzle outlet and rotatable whereby to spread adhesive supplied through said nozzle over the surface of the marginal portions of the shoe bottom as the tool is caused to operate progressively therealong as aforesaid.

A further application of the present invention is to be found in a machine for performing an operation progressively along side wall portions of lasted shoes, said machine being characterised by a shoe support for supporting a lasted shoe such that side wall portions of the shoe are exposed, a tool support arrangement by which a holder for a rotary radial tool is supported for pivotal movement about a first axis extending transversely of the bottom of a shoe supported by the shoe support and also for pivotal movement about a second axis extending lengthwise of such shoe bottom, said first and second axes intersecting with each other at a point which lies on the axis of rotation of such tool so that said point is not displaced in relation to said axis of rotation when pivotal movement about either of the first and second axes is effected, first drive means for effecting relative movement between the shoe support and the tool holder in directions extending lengthwise and transversely of the bottom of a shoe supported by the shoe support, second drive means for effecting relative movement between the shoe support and the tool holder in a direction extending heightwise of the shoe bottom whereby a tool supported by the tool holder can be caused to operate progressively along side wall portions of the shoe, and third and fourth drive means for effecting pivotal movement of the tool holder respectively about the first and second axes, whereby a tool supported by the tool holder can be disposed, as relative movement is effected between the shoe support and the tool holder in directions extending lengthwise, widthwise and heightwise of the shoe bottom as aforesaid, with its axis of rotation extending parallel, or substantially parallel, to a line which lies in a plane extending transversely of the shoe bottom and perpendicularly thereto and passing through the region of engagement of the operating surface portion of the tool with the side wall portion and which extends along or tangentially to the side wall portion in said region.

It will thus be appreciated that, using such a device, it can be ascertained that the plane of the operating surface of the tool, in directions extending both lengthwise and widthwise of the shoe, can be maintained in a desired angular relationship with the side wall portion of the shoe to give an optimum roughing treatment on the latter.

This embodiment of the invention is especially, but not exclusively, useful for carrying out a side wall roughing operation on shoes. To this end, the tool supported by the tool holder may be a radial wire brush or an abrasive covered wheel, but preferably a special tool is provided comprising two spaced-apart discs and, extending therebetween, a plurality of pins on each of which a roughing device is loosely mounted; by "loosely mounted" in this context is intended to be understood a facility for not only rotational movement about the pin but also centrifugal movement in response to the rotation of the tool as a whole about its axis of rotation. In one case each roughing device may comprise a roll having a knurled or serrated surface; alternatively, each roughing device may comprise one or more plate-like elements having a roughing edge by which the shoe upper is engaged in a flail-like action as the tool is caused to rotate. Tools using roughing devices as referred to above have been found to be especially useful since it is not possible to ensure that all shoes will be the same as one another or indeed the same as the model size which has previously been used for digitising in compiling the programmed instruction and the facility for outward movement of each roughing device, under centrifugal force, enables irregularities in the side wall portions to be readily accommodated as between successive shoes. Moreover, since in said machine, the side wall treatment operation can be effected on left or right shoes, using the same programmed instruction, and there is a need recognised for the symmetrical treatment of left and right shoes, conveniently means, including a reversible motor, is provided for effecting rotation of the tool, the direction of rotation of the tool being reversed for left and right shoes.

In both embodiments of the invention and generally in carrying out the present invention the control of the various movements is preferably under numerical control, by which is to be understood, where used herein, a control which provides drive signals in accordance with a programmed instruction, usually in the form of digitised coordinate axis values. Similarly, the phrase "n.c. motor" where used herein is to be understood as meaning a motor which operates under numerical control. Examples of such motors are of course stepping motors and d.c. servomotors.

In machines in accordance with the invention, therefore, preferably the first, second, third and fourth drive means comprise n.c. motors (as hereinbefore defined) operable in accordance with a programmed instruction appropriate to the style of shoe being operated upon.

Moreover, where the machines are so provided, conveniently operator-actuatable means is provided for enabling a programmed instruction to be created when the machine is in a "teaching" mode, for execution in a subsequent "operating" mode, said means being effective, using said n.c. motors, to enable, under operator control, a plurality of points along the marginal portions of the bottom or side wall portions, as the case may be, of a model shoe to be determined in terms of the length, width and height of the shoe and in addition the angular disposition of the tool holder about said first and second axes in respect of each such point.

For achieving the various movements in a relatively simple manner, and with the above-mentioned object in view, conveniently the tool support arrangement supports a carrier for pivotal movement about said first axis, said carrier itself supporting the tool holder through a linkage system whereby the tool holder can be caused to pivot about said second axis. Moreover such linkage system in said arrangement comprises a first parallel linkage arrangement interconnecting the tool holder with a second parallel linkage arrangement itself supported by the carrier, the two arrangements thus providing a virtual centre about which the tool holder can pivot (constituting the second axis) while the third drive means is operatively connected to said linkage system via a push-rod. By such an arrangement, it will be appreciated, the pivotal movement about the orthogonal axes can readily be achieved with a minimum of inertia and with a consequent speedy response time.

In said preferred embodiment, furthermore, the tool support arrangement comprises a hollow support member which extends in a direction lengthwise of the shoe bottom and within which is accommodated, for rotation therein, a support rod on which said carrier is mounted, the support rod being operatively connected to the fourth drive means. The hollow support member is supported by a mounting and projects forwardly (i.e. towards the tool holder) therefrom, said mounting being itself mounted for pivotal movement about third and fourth axes in directions extending respectively heightwise and widthwise of the shoe bottom, thus to effect widthwise and heightwise movement of the tool support arrangement relative to the shoe support as aforesaid (Y-axis and Z-axis movement respectively). Conveniently, furthermore, the shoe support is mounted for movement in a direction extending lengthwise of the shoe bottom (X-axis movement), more particularly is mounted for pivotal movement about a fifth axis extending widthwise of the shoe bottom, the height datum of the machine being in a fixed relationship with said fifth axis.

It will thus be appreciated that, using the machines in accordance with the invention, it is possible to operate upon shoes having pronounced heightwise contours both widthwise and lengthwise of the shoe bottom, maintaining the axis of rotation of the tool coincident with or parallel to (according to the type of machine and tool being used) a line extending normally or substantially normally, in directions both lengthwise and transversely of the shoe bottom, to the portion of the surface of the shoe bottom at or laterally adjacent the region of engagement of the tool with the shoe. Furthermore, because the setting of the angular disposition of the axis of rotation of the tool is about a given point at which the tool is disposed, it is possible to grade the tool path in a simple but efficient manner.

BRIEF DESCRIPTION OF THE DRAWINGS

There now follows a detailed description, to be read with reference to the accompanying drawings, of two machines in accordance with the invention, which machines, it will be appreciated, have been selected for description merely by way of exemplification of the invention and not by way of limitation thereof.

In the accompanying drawings.

DESCRIPTION OF THE PREFERRED EMBODIMENTS

Figure 1:
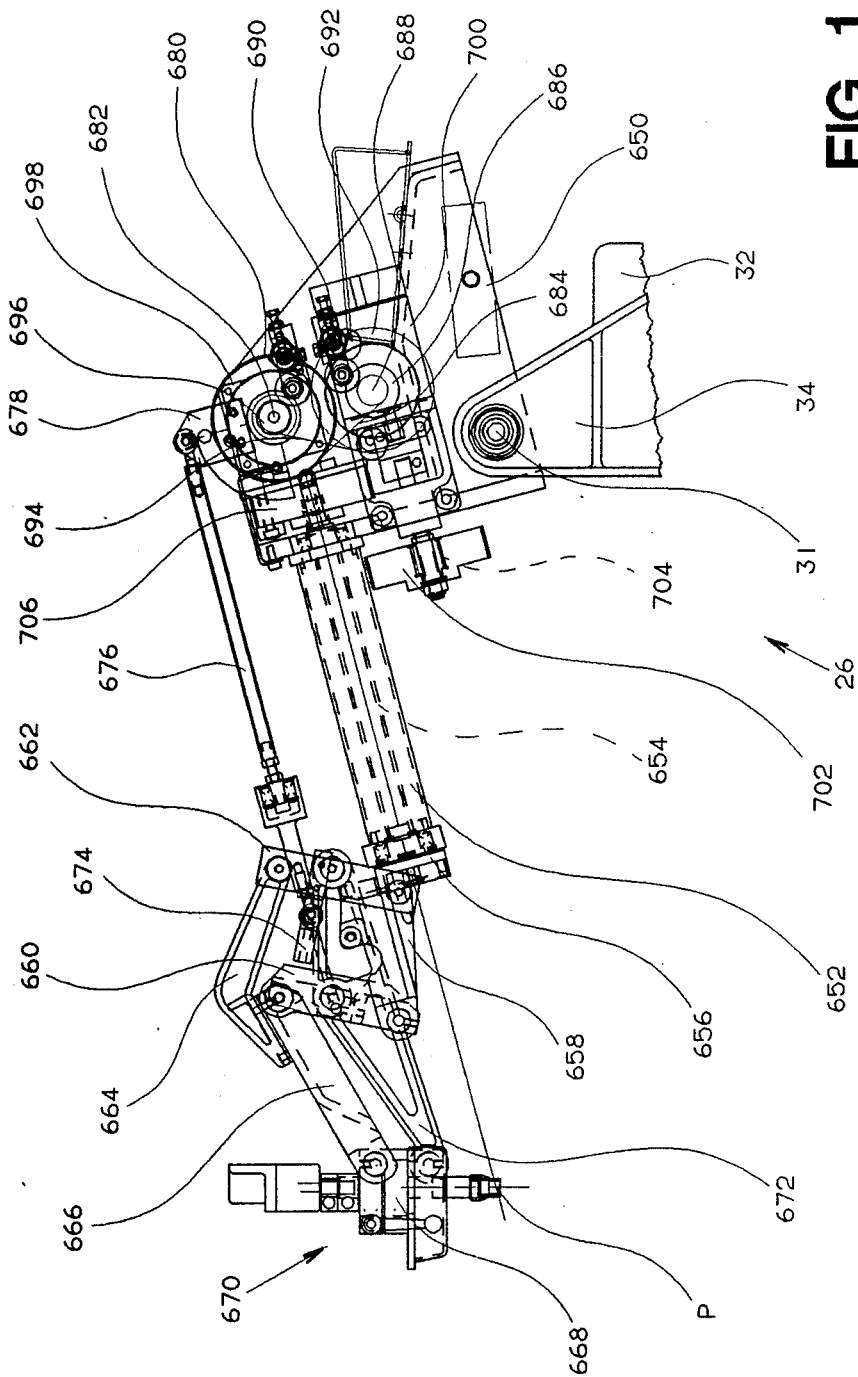
FIG. 1 is a view in side elevation of a tool support arrangement of a first machine in accordance with the invention, being a machine for performing an adhesive-applying operation progressively along marginal portions of the bottoms of lasted shoes, with tools supported thereby.
Figure 2:
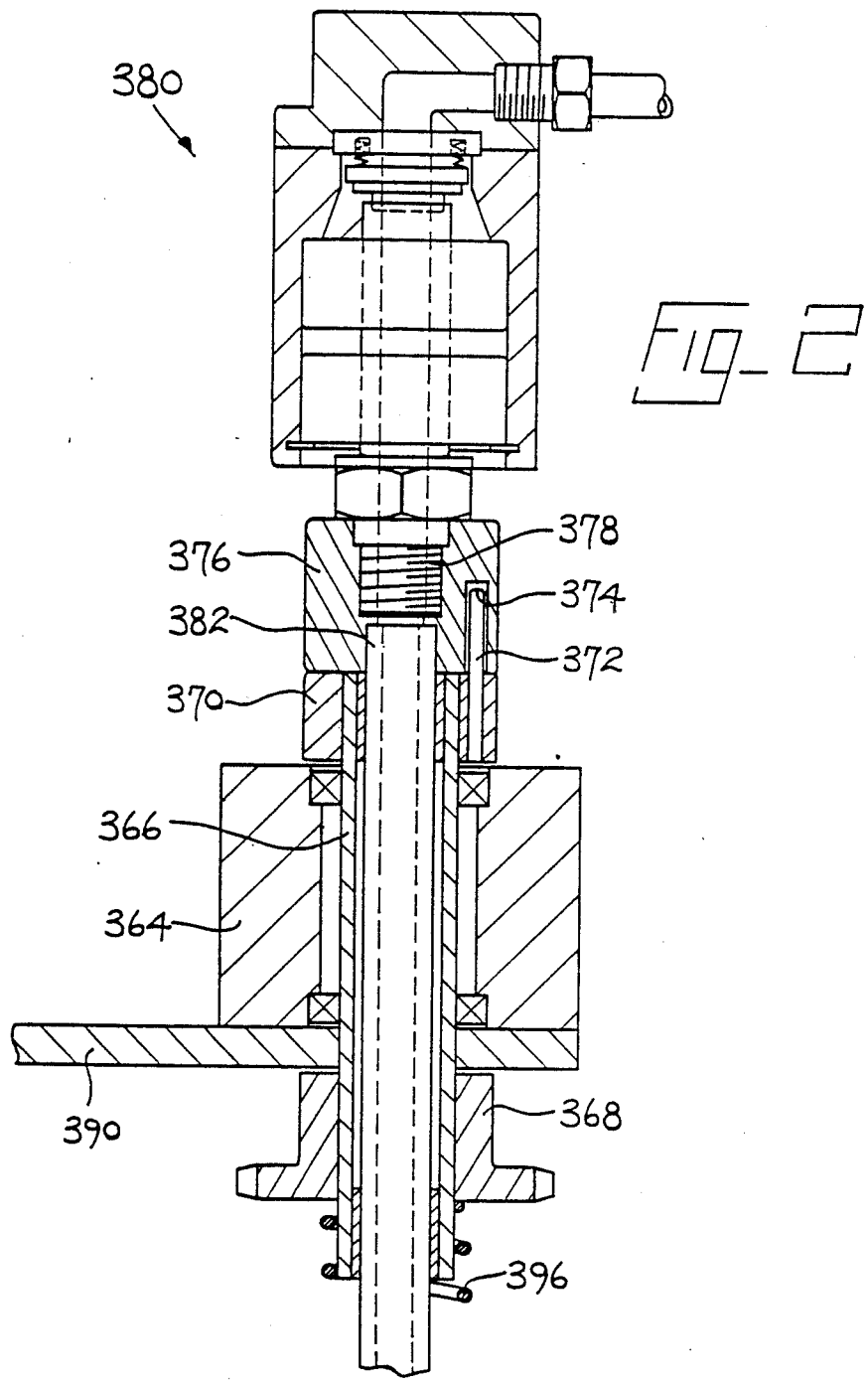
FIG. 2 is a fragmentary view, partly in section, showing details of the tool used in the first machine in accordance with the invention.
Figure 3:
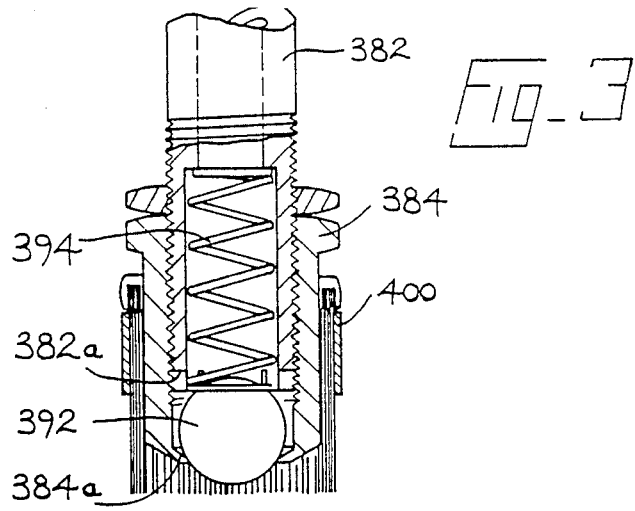
FIGS. 3 and 4 are fragmentary views showing a ball of the tool shown in FIG. 3, respectively in its sealing position and moved out of said position by engagement with a shoe bottom.
Figure 4:
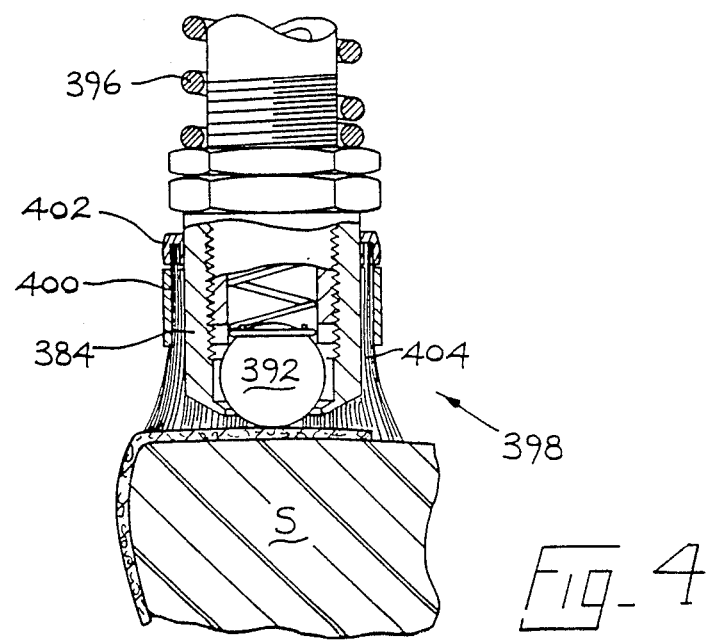

The two machines in accordance with the invention now to be described are generally similar, except as hereinafter described to the machine described in EP-A0091321, which is itself a modification of the apparatus described in EP-A0043645, this machine (apparatus) being for performing a roughing operation progressively along marginal portions of a shoe bottom. Reliance is thus placed upon the disclosure of the aforementioned EP specifications and in particular, where like parts are incorporated in the various machines but are not shown in the drawings of the present invention, the reference numerals from the earlier specification are used, but are placed in brackets to indicate that the parts are not shown in the present drawings.

Each of the machines in accordance with the invention thus comprises a base (10) supporting, by a bracket (12), a pivot shaft (14) about which a support (16) for a shoe support (18) can pivot. The shoe support is arranged to support a shoe (S) bottom uppermost, with the toe end thereof facing towards the front of the machine, i.e. towards the operator. At its rear, the base (10) supports a support column structure (22) carrying a casting (24) on which is supported, for pivotal movement about a vertical axis, a support casting 34 having two upstanding lugs 32 between which tool supporting means generally designated 26' is supported for pivotal movement about a horizontal axis 31.

The machine further comprises a first stepping motor (144) mounted on the base (10) and effective to cause pivotal movement of the shoe support (18) to take place about the horizontal axis provided by the shaft (14) (X-axis movement). Similarly, a second stepping motor (84) is provided, carried by the casting (24) and effective to cause pivotal movement of the support casting 34 about its vertical axis (Y-axis movement). In addition, a third stepping motor (122—described in EP-A0043645) is supported by the support casting 34, rearwardly of its vertical pivot, to cause it, and thus the tool support means 26' supported thereby, to pivot about its horizontal axis 31 (Z-axis movement). It will be appreciated that the X-, Y- and Z-axes represent three coordinate axes along which a tool supported by the tool supporting means 26' can move.

Further details of the construction by which movement along the three axes can take place can be found in EP-A0091321 and also in EP-A0043645.

The tool supporting means 26' of the machine in accordance with the invention comprises a housing 650 mounted for pivotal movement about said horizontal axis 31. From a forward face of the housing projects a hollow, tubular arm 652 within which is accommodated, for rotational movement therein, a support rod 654. At the forward end of said rod is a plate 656 supporting two forwardly projecting arms 658, which are spaced apart widthwise of the machine and on each of which is mounted, for pivotal movement, a pair of links 660, 662, upper ends of which pivotally support a plate 664. The links 660, 662, together with the plate 664 and arms 658, thus comprise a first parallel linkage arrangement of the tool supporting means.

Fixedly secured to a forward end of the plate 664, and projecting forwardly therefrom, is a further plate 666, in a forward, bifurcated, end of which is pivotally mounted a block 668 forming part of a tool holder generally designated 670. Also secured to the tool holder, at the left-hand side thereof, is a further link 672 which is in turn pivotally connected to each of the left-hand links 660, 662. The links 660, 662, tool holder 670, link 672 and composite plate 664, 666 thus constitute a second parallel linkage of the tool supporting means. The various pivots are so arranged in relation to one another that the tool holder is caused to pivot about an axis (a virtual centre) which passes through a point P, through which point also passes the axis of the support rod 654. As will be described hereinafter, furthermore, when a tool is supported in the tool holder 670, the axis of rotation thereof also passes through said point P. The point P represents a height datum of the machine in a desired relationship with which the bottom of a shoe supported by the shoe support (18) can be positioned by means of a holddown member (450) and toe support means (470) of said support.

For effecting such pivotal, or tilting, movement of the tool holder 670 about the transverse axis, the links 662 carry therebetween a block 674 to which is pivotally connected a forward end of a push-rod 676, the rearward end of which is similarly pivotally connected to a block 678 which is mounted on a pulley 680 freely rotatable about a drive shaft 682. The pulley 680 is caused to rotate about said shaft by a timing belt 684 entrained around a second pulley 688, a tensioning pulley 690 being provided for maintaining the tension in the belt. Also mounted on the shaft 688 is a third pulley 692 around which is entrained a second timing belt 694 meshing with a fourth, drive, pulley 696 secured on the drive shaft 682. The shaft 682 is driven by a stepping motor 698 (constituting third drive means of the machine in accordance with the invention).

For effecting rotational movement of the support rod 654, a similar drive arrangement is provided comprising a stepping motor 700 acting through pulleys 702, 704, 706 (the fourth not being shown) and timing belts (not shown), the pulley 706 being fixedly mounted on the support rod 654. This drive arrangement thus constitutes fourth drive means of the machine in accordance with the invention.

Referring now to FIGS. 1 to 4, the tool holder 670 of the first machine in accordance with the invention is arranged to support a tool in the form of an adhesive applicator device generally as described in EP-A0276944, the tool being fixedly mounted in the block 668. (The mounting arrangement is generally similar to the alternative mounting arrangement referred to in the aforementioned specification). The adhesive applicator device thus comprises a hollow shaft 366 mounted in the block 668 and carrying at its lower end a spocket 368 pivotally connected by a chain (not shown but numbered 386 in said specification) to an electric motor also carried on the tool holder 670. At its upper end the shaft 366 carries a collar 370 in which is secured an upstanding pin 372 accommodated in a bore 374 of a further collar 376 which is threadedly secured to an output end 378 of a rotary coupling generally designated 380; one such coupling is available commercially from Deublin Limited. Force-fitted into the collar 376, furthermore, is the upper end of an adhesive supply tube 382 which passes through the hollow shaft 366 and has screw-threaded on the lower end thereof a nozzle housing 384 (see FIGS. 3 and 4). It will thus be appreciated that rotation of the sprocket 368 causes, through the pin 372 and bore 374, rotation of the tube 382 and thus of the nozzle housing 384 secured thereto.

The nozzle housing 384 has a frustoconical lower end face 384a which provides an annular rim spaced from the lower end face 382a of the tube 382 to form therein a chamber in which a ball 392 is accommodated with a portion thereof projecting beyond the annular rim. A spring 394 is accommodated in a counter-sink formed in the lower end of the tube 382 and urges the ball against the annular rim into a sealing position in which adhesive flow through the nozzle is prevented. The application of pressure to the projecting portion of the ball 392, on the other hand, causes it to retract against the lower end 382a of said counter-sink, which is slotted so as to allow adhesive flow from the tube when the ball is urged thereagainst, such adhesive then flowing over the surface of the ball and out between the annular rim and the projecting portion of the ball.

It will thus be appreciated that, in using the first machine in accordance with the invention, pressing the ball 392 against a component to be coated with adhesive causes the ball to retract, to allow adhesive to be supplied through the nozzle, the supply continuing until the ball is moved out of contact with the component whereupon sealing takes place substantially immediately with consequent cut-off of the adhesive. The ball is shown in its retracted condition in FIG. 4.

The nozzle housing 384 is capable of "floating" relative to the bearing block 364, that is to say excessive pressure applied to the ball is accommodated by sliding movement of the nozzle housing bodily in relation to the hollow shaft 366, so that any irregularities in the surface of the shoe bottom to be coated with adhesive, in relation to the heightwise path as determined by the third n.c. motor, can be accommodated. To ensure that the nozzle housing is urged into its lowered position, a further spring 396 is provided acting between the nozzle housing and the underside of the hollow shaft. It will of course be appreciated that the force applied by the spring 396 is significantly greater than that applied by the spring 394, so as to ensure that the ball will first retract when engaged. As can be seen from FIG. 1, when the housing is in its lowermost position it lies below the point P. In a digitising operation, however, in setting the Z-axis position desirably the operative surface portion of the tool is set at the point P, that is to say a certain amount of the "float" is taken up during digitising, thereby allowing variations of a plus or minus value from that position to take place according to any irregularities in the contour of the shoe bottom. Conveniently for determining the amount of float, the operator, when carrying out a digitising procedure, has regard to the distance between the two collars 370, 376. If desired, furthermore, a scale may be provided on one of the collars to assist the operator.

For spreading the adhesive which is supplied through the nozzle, a brush assembly generally designated 398 is secured to the outside of the nozzle housing 384, e.g. by a Jubilee clip 400. The brush assembly 398 comprises a ring 402, e.g. of plastics material, which is slid along the nozzle housing and in which are embedded sets of bristles 404 arranged to form a cylindrical shape which surrounds the nozzle housing and projects beyond the end face 384a, being disposed about the whole of the periphery of said end face 384a. By virtue of its being fixed to the housing as aforesaid, the brush assembly 398 rotates with the nozzle housing 384.

Figure 5:
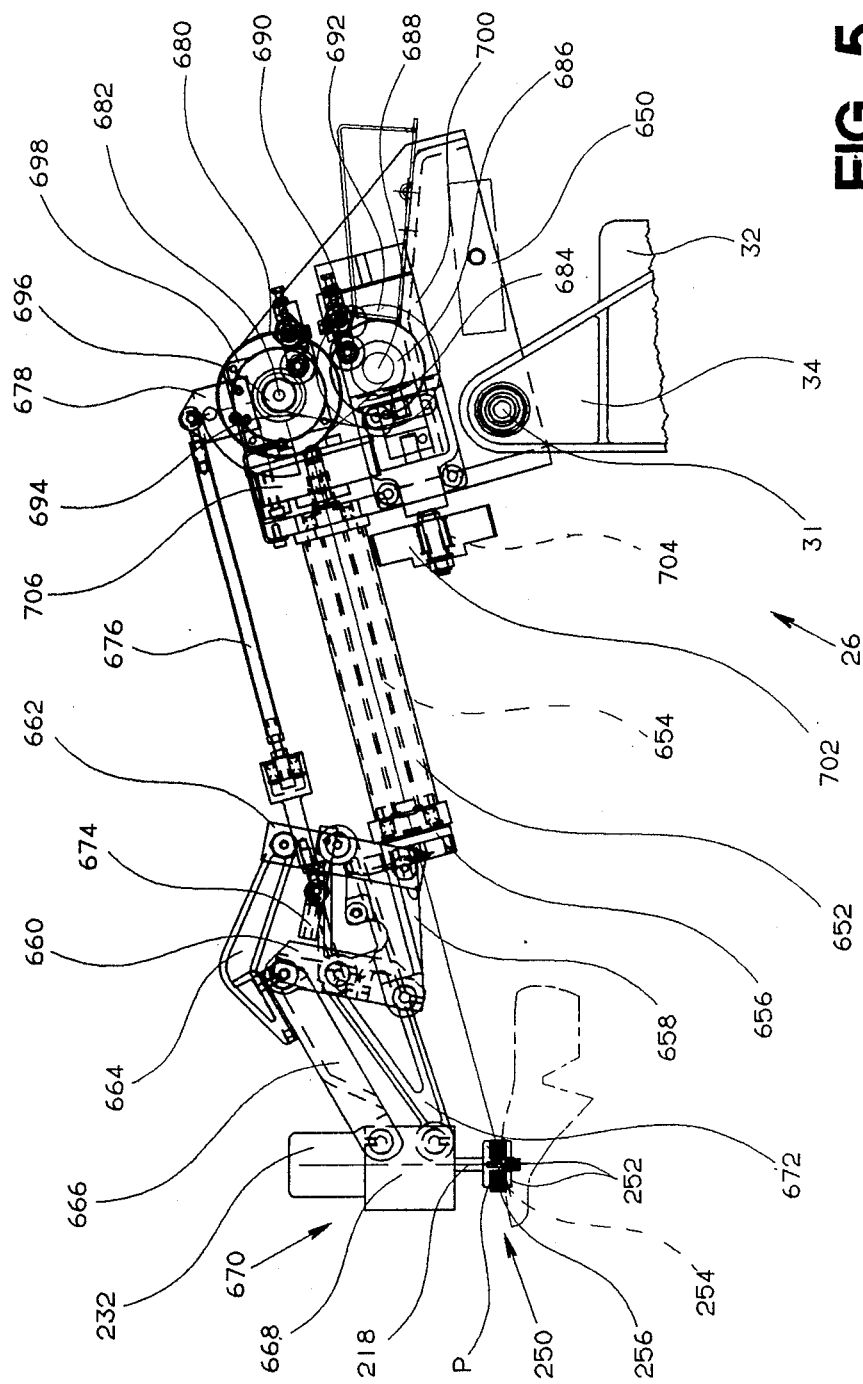
FIG. 5 is a view in side elevation of a tool support arrangement of the second machine in accordance with the invention, being a machine for performing a roughing operation progressively along side wall portions of lasted shoes, with a tool supported thereby.
Figure 6:
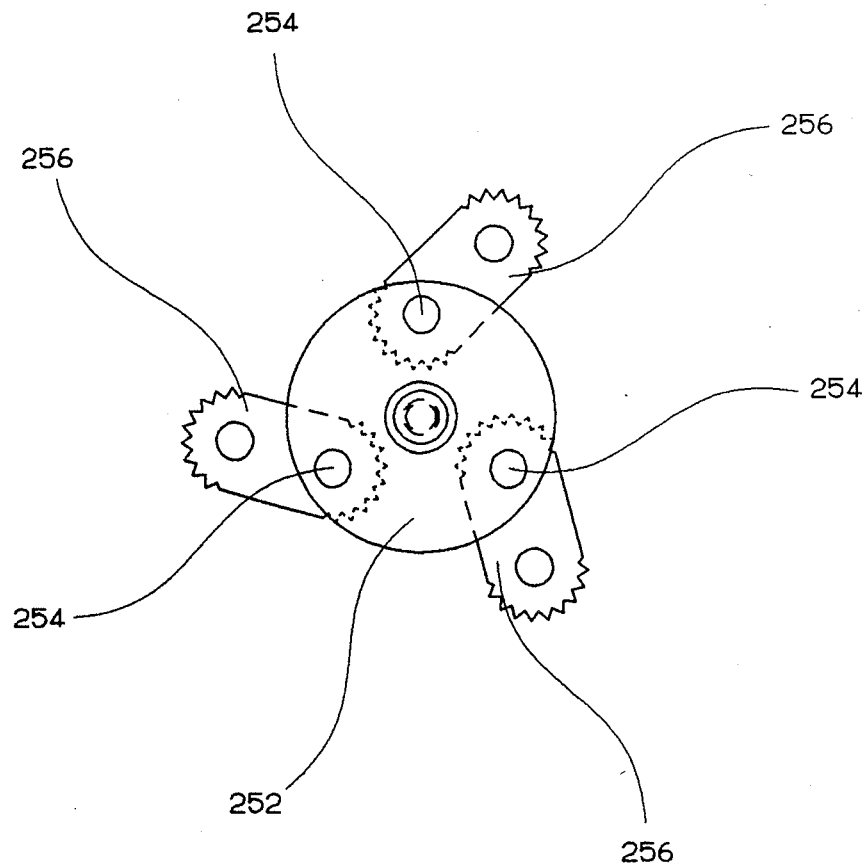
FIG. 6 is a view of a roughing tool having flail-like roughing devices, for use in the second machine in accordance with the invention.

Referring now to FIGS. 5 and 6, the tool holder 670 of the second machine in accordance with the invention is arranged to support a tool-supporting shaft 218 which is caused to rotate by means of a reversible motor 232, itself mounted on the tool holder 670 and being operatively connected to the shaft 218 via a belt-and-pulley connection (not shown). The lower end of the shaft 218 is adapted to receive a suitable roughing tool generally designated 250. Whereas this tool may be any suitable roughing tool, e.g. a radial wire brush or an abrasive-covered wheel, in the embodiment shown in the drawings the tool comprises two discs 252 spaced apart from one another by three pins 254, each pin supporting a plurality of thin plate-like roughing elements 256. As is clearly seen in FIG. 2, each plate-like element 256 is loosely mounted on its pin for pivotal movement thereon, is generally oval in shape and comprises, at each semicircular end a plurality of teeth, the teeth providing a roughing surface of the tool. When the tool is caused to rotate, the various plate-like elements are urged outwardly about the pins 252, by virtue of centrifugal force, in a flail-like action. It will of course be appreciated that, since a plurality of such elements is provided on each pin, the amount to which each element is thrown outwardly by centrifugal force will be determined to some degree by the contour of the shoe which is engaged thereby, each set of such elements thus together forming a shape, upon engagement with the shoe, complementary to the contour of the portion of the side wall of the shoe being roughed thereby. It will also be appreciated that, using a tool as described above, any irregularities in the side wall portion of the shoe being operated upon may be compensated for by the action of the elements 256.

As already mentioned, both machines in accordance with the invention described above have an "operating" mode and a "teaching" mode. For the purpose of the latter, operator-actuatable means in the form of a cursor arrangement (not shown) or a joystick control (also not shown) is provided whereby the path of movement of the tool can be determined; the particular path determination procedure is described in detail in e.g. US-A4541054. In addition, further operator-actuatable means (again not shown) is provided whereby under operator control the angular disposition of the tool holder 670 about the point P can be set, for each digitised point about the axis of the support rod 654 (usually referred to as the "camber" setting) and also about the virtual centre as determined by the two parallel linkage arrangements referred to above (usually referred to as the "tilt" control). In the "operating" mode, thereafter, not only does the tool follow the path as digitised, but in addition the angular disposition of the tool about said two axes is progressively varied according to the settings made during the "teaching" mode.

It will thus be appreciated that, using such a machine, it is possible, in addition to controlling the path of movement of the shoe along the X-, Y- and Z-axes, also to set the angular disposition of the tool both widthwise and lengthwise of the shoe bottom using the third and fourth drive means described above. It will thus be appreciated furthermore that in this way shoe bottoms having steeply inclined waist portions and significantly shaped lateral contours can readily be operated upon, while maintaining the axis of rotation of the tool, in the case of the first machine in accordance with the invention, normal or substantially normal to the portion of the surface of the shoe bottom at the region of engagement of the tool with the shoe bottom and, in the case of the second machine in accordance with the invention, parallel or substantially parallel to a line which lies in a plane extending transversely of the shoe bottom and perpendicularly thereto and passing through the region of engagement of the operating surface portion of the tool with the side wall portion and which extends along or tangentially to the side wall portion in said region.

For the digitising procedure itself and also for controlling the operation of the machine in its operating mode the machine also comprises computer control means. This means comprises a memory in which a number of programed instructions can be stored for different styles of shoe and also in which a number of sub-routines are stored for processing the data relating to the various styles. Thus one such sub-routine serves to determine the path the tool will follow, based upon the digitised points. A further sub-routine is a grading programme which, according to the shoe length, as "measured" by the shoe support (18) (details of the shoe length measuring arrangement are described in GB-A2077090), is effective correspondingly to vary the distance between successive digitised points along the X-axis and also proportionately to vary the Y-axis movement, such variation of the X-axis movement also serving to vary the incidence of the Z-axis movement and the pivotal movement about the first and second axes ('camber' and 'tilt' movement) of the tool holder 670.

Whereas in the embodiment described above a roughing tool is used for operating on the side wall portions of a shoe, this tool could readily be replaced by an applicator tool for the application of primer or adhesive to such side wall portions.

We claim:

1. Machine for performing a progressive operation on marginal portions of a shoe in the manufacture thereof comprising
    a shoe support for supporting a lasted shoe such that the shoe bottom is positioned in a desired relationship with a height datum of the machine, and
    a tool support arrangement by which a tool holder is supported for pivotal movement about a first axis extending transversely of the bottom of a shoe support by the shoe support and about a second axis extending perpendicularly to the first axis lengthwise of the shoe bottom,
wherein the holder supports a tool in such a manner that the point of intersection of the axes lies on a longitudinal centre line of the tool and a plane, in which an operating surface portion of the tool lies, extends perpendicularly to the longitudinal centre line of the tool and passes through said point of intersection and remains undisplaced therefrom when pivotal movement of the tool holder takes place about either of said axes, the machine further comprising
    first drive means for effecting relative movement between the shoe support and the tool holder in directions extending lengthwise and transversely of the bottom of a shoe supported by the shoe support, whereby a tool supported by the tool holder can be caused to follow the plan contour of such shoe bottom,
    second drive means for effecting relative movement between the shoe support and the tool holder in a direction extending heightwise of the shoe bottom and thus for varying the relationship between a tool supported by said holder and said height datum whereby, as relative lengthwise and transverse movement takes place as aforesaid between the shoe support and the tool support arrangement, such tool can be caused to follow the height contour of the shoe bottom, and
    third and fourth drive means for effecting such pivotal movement respectively about the first and second axes whereby, as a tool supported by the tool holder is caused to follow the plan and height contours of the shoe bottom as aforesaid, the longitudinal centre line thereof is maintained coincident with or parallel to a line extending substantially normally, in directions both lengthwise and transversely of the shoe bottom, to the portion of the surface of the shoe bottom at or laterally adjacent the region of engagement of the tool with the shoe.

2. Machine for performing an operation progressively along marginal portions of the bottoms of lasted shoes, comprising
    a shoe support for supporting a lasted shoe such that the shoe bottom is positioned in a desired relationship with a height datum of the machine,
    a tool support arrangement by which a holder is supported in which a tool is mounted for rotation about an axis extending heightwise of the bottom of a shoe supported by the shoe support, said holder being supported as aforesaid for pivotal movement about a first axis extending transversely of such shoe bottom and also for pivotal movement about a second axis extending lengthwise of such shoe bottom, and said first and second axes intersecting with each other at a point which lies on the axis of rotation of such tool whereby, with an operating surface portion of the tool disposed at said point, said operating surface portion remains undisplaced from said point when pivotal movement about either of the first and second axes is effected, first drive means for effecting relative movement between the shoe support and the tool holder in directions extending lengthwise and transversely of the bottom of a shoe supported by the shoe support, whereby a tool supported by the tool holder can be caused to follow the plan contour of such shoe bottom, second drive means for effecting relative movement between the shoe support and the tool holder in a direction extending heightwise of the shoe bottom and thus for varying the relationship between a tool supported by said holder and said height datum whereby, as relative lengthwise and transverse movement takes place as aforesaid between the shoe support and the tool support arrangement, such tool can be caused to follow the height contour of the shoe bottom, and third and fourth drive means for effecting pivotal movement of the tool holder respectively about the first and second axes, whereby a tool supported by the tool holder can be disposed, as it is caused to follow the plan and height contours of the shoe bottom as aforesaid, with its axis of rotation extending substantially normally, in directions both lengthwise and transversely of the shoe bottom, to the shoe bottom portion at the region of engagement with its operating surface, wherein the first, second, third and fourth drive means comprise n.c. motors operable in accordance with a programmed instruction appropriate to the style of shoe being operated upon.

3. Machine according to claim 2 wherein operator-actuatable means is provided for enabling a programmed instruction to be created when the machine is in a "teaching" mode, for execution in a subsequent "operating" mode, said means being effective, using said n.c. motors, to enable, under operator control, a plurality of points along the marginal portions of a model shoe bottom to be determined in terms of the length, width and height of the shoe bottom and in addition the angular disposition of the tool holder about said first and second axes relative to such shoe bottom in respect of each such point.

4. Machine according to claim 2 wherein the tool is mounted in the holder for sliding movement in a direction extending along its axis of rotation such that its operating surface portion is capable of taking up a position along said axis of rotation at either side of the point of intersection of said first and second axes according to the relationship between the shoe bottom and the height datum of the machine.

5. Machine for performing an operation progressively along marginal portions of the bottoms of lasted shoes, comprising a shoe support for supporting a lasted shoe such that the shoe bottom is positioned in a desired relationship with a height datum of the machine, a tool support arrangement by which a holder is supported in which a tool is mounted for rotation about an axis extending heightwise of the bottom of a shoe supported by the shoe support, said holder being supported as aforesaid for pivotal movement about a first axis extending transversely of such shoe bottom and also for pivotal movement about a second axis extending lengthwise of such shoe bottom, and said first and second axes intersecting with each other at a point which lies on the axis of rotation of such tool whereby, with an operating surface portion of the tool disposed at said point, said operating surface portion remains undisplaced from said point when pivotal movement about either of the first and second axes is effected, first drive means for effecting relative movement between the shoe support and the tool holder in directions extending lengthwise and transversely of the bottom of a shoe supported by the shoe support, whereby a tool supported by the tool holder can be caused to follow the plan contour of such shoe bottom, second drive means for effecting relative movement between the shoe support and the tool holder in a direction extending heightwise of the shoe bottom and thus for varying the relationship between a tool supported by said holder and said height datum whereby, as relative lengthwise and transverse movement takes place as aforesaid between the shoe support and the tool support arrangement, such tool can be caused to follow the height contour of the shoe bottom, and third and fourth drive means for effecting such pivotal movement respectively about the first and second axes whereby a tool supported by the tool holder can be disposed, as it is caused to follow the plan and height contours of the shoe bottom as aforesaid, with its axis of rotation extending substantially normally, in directions both lengthwise and widthwise of the shoe bottom, to the shoe bottom portion at the region of engagement with its operating surface, wherein the tool is mounted in the holder for sliding movement in a direction extending along its axis of rotation such that its operating surface portion is capable of taking up a position along said axis of rotation at either side of the point of intersection of said first and second axes according to the relationship between the shoe bottom and the height datum of the machine.

6. Machine according to claim 5 wherein the tool comprises an adhesive applicator device comprising a nozzle having an outlet disposed at the point of intersection of the first and second axes, and a brush assembly surrounding the nozzle outlet and rotatable whereby to spread adhesive supplied through said nozzle over the surface of the marginal portions of the shoe bottom as the tool is caused to operate progressively therealong as aforesaid.

7. Machine according to claim 5 wherein the tool support arrangement supports a carrier for pivotal movement about said first axis, said carrier itself supporting the tool holder through a linkage system whereby the tool holder can be caused to pivot about said second axis.

8. Machine according to claim 7 wherein the linkage system comprises a first parallel linkage arrangement interconnecting the tool holder with a second parallel linkage arrangement itself supported by the carrier, the two arrangements thus providing a virtual centre constituting the second axis.

9. Machine according to claim 8 whereby the third drive means is operatively connected to said linkage system via a push-rod.

10. Machine according to claim 8 wherein the tool support arrangement comprises a hollow support member extending in a direction lengthwise of the shoe bottom, within which support member is accommodated, for rotation therein, a support rod on which said carrier is mounted, the support rod being operatively connected to the fourth drive means.

11. Machine according to claim 10 wherein the hollow support member is supported by a mounting and projects forwardly (i.e. towards the tool holder) therefrom, said mounting being itself mounted for pivotal movement about third and fourth axes in directions extending respectively heightwise and widthwise of the shoe bottom, thus to effect widthwise and heightwise movement of the tool support arrangement relative to the shoe support as aforesaid, and wherein the shoe support is mounted for movement in a direction extending lengthwise of the shoe bottom.

12. Machine according to claim 11 wherein the shoe support is mounted for pivotal movement about a fifth axis extending widthwise of the shoe bottom, the height datum of the machine being in a fixed relationship with said fifth axis.

13. Machine for performing an operation progressively along marginal portions of the bottoms of lasted shoes, comprising
a shoe support for supporting a lasted shoe such that the shoe bottom is positioned in a desired relationship with a height datum of the machine,
a tool support arrangement
first drive means for effecting relative movement between the shoe support and the tool support arrangement in directions extending lengthwise and transversely of the bottom of a shoe supported by the shoe support, whereby a tool supported by the tool support arrangement can be caused to follow the plan contour of such shoe bottom, and
second drive means for effecting relative movement between the shoe support and the tool support arrangement in a direction extending heightwise of the shoe bottom and thus for varying the relationship between a tool supported by said arrangement and said height datum whereby, as relative lengthwise and transverse movement takes place as aforesaid between the shoe support and the tool support arrangement, such tool can be caused to follow the height contour of the shoe bottom,
wherein the tool support arrangement supports a carrier for pivotal movement about a first axis extending lengthwise of the bottom of a shoe supported by the shoe support, said carrier itself supporting a tool holder through a linkage system whereby the tool holder can be caused to pivot about a second axis extending widthwise of such shoe bottom, in which tool holder a tool is mounted for rotation about an axis extending heightwise of the shoe bottom, the construction and arrangement being such that the first and second axes intersect with one another at a point which lies on the axis of rotation of the tool, the machine further comprising third and fourth drive means for effecting such pivotal movement respectively about the first and second axes whereby a tool supported by the tool holder can be disposed, as it is caused to follow the plan and height contours of the shoe bottom as aforesaid, with its axis of rotation extending substantially normally, in directions both lengthwise and widthwise of the shoe bottom, to the shoe bottom portion at the region of engagement with its operating surface.

14. Machine for performing an operation progressively along side wall portions of lasted shoes, comprising
a shoe support for supporting a lasted shoe such that side wall portions of the shoe are exposed,
a tool support arrangement by which a holder for a rotary radial tool is supported for pivotal movement about a first axis extending transversely of the bottom of a shoe supported by the shoe support and also for pivotal movement about a second axis extending lengthwise of such shoe bottom, said first and second axes intersecting with each other at a point which lies on the axis of rotation of such tool so that said point, remains undisplaced in relation to said axis of rotation when pivotal movement about either of the first and second axes is effected,
first drive means for effecting relative movement between the shoe support and the tool holder in directions extending lengthwise and transversely of the bottom of a shoe supported by the shoe support,
second drive means for effecting relative movement between the shoe support and the tool holder in a direction extending heightwise of the shoe bottom whereby a tool supported by the tool holder can be caused to operate progressively along side wall portions of the shoe, and
third and fourth drive means for effecting pivotal movement of the tool holder respectively about the first and second axes, whereby a tool supported by the tool holder can be disposed, as it is caused to operate progressively as aforesaid, with its axis of rotation extending substantially parallel, to a line which lies in a plane extending transversely of the shoe bottom and perpendicularly thereto and passing through the region of engagement of the operating surface portion of the tool with the side wall portion and which extends along or tangentially to the side wall portion in said region.

15. Machine according to claim 14 wherein the first, second, third and fourth drive means comprise n.c. motors operable in accordance with a programmed instruction appropriate to the style of shoe being operated upon.

16. Machine according to claim 14 wherein the tool support arrangement supports a carrier for pivotal movement about said first axis, said carrier itself supporting the tool holder through a linkage system whereby the tool holder can be caused to pivot about said second axis.

17. Machine according to claim 16 wherein the linkage system comprises a first parallel linkage arrangement interconnecting the tool holder with a second parallel linkage arrangement itself supported by the carrier, the two arrangements thus providing a virtual centre constituting the second axis.

18. Machine according to claim 17 whereby the third drive means is operatively connected to said linkage system via a push-rod.

19. Machine according to claim 17 wherein the tool support arrangement comprises a hollow support member extending in a direction lengthwise of the shoe bottom, within which support member is accommodated, for rotation therein, a support rod on which said carrier is mounted, the support rod being operatively connected to the fourth drive means.

20. Machine according to claim 19 wherein the hollow support member is supported by a mounting and projects forwardly therefrom, said mounting being itself mounted for pivotal movement about third and fourth axes in directions extending respectively heightwise and widthwise of the shoe bottom, thus to effect widthwise and heightwise movement of the tool support arrangement relative to the shoe support as aforesaid, and wherein the shoe support is mounted for movement in a direction extending lengthwise of the shoe bottom.

21. Machine according to claim 14 wherein the shoe support is mounted for pivotal movement about a fifth axis extending widthwise of the shoe bottom.

22. Machine according to claim 14 wherein operator-actuatable means is provided for enabling a programmed instruction to be created when the machine is in a "teaching" mode, for execution in a subsequent "operating" mode, said means being effective, using said n.c. motors, to enable, under operator control, a plurality of points along the side wall portions of a model shoe to be determined in terms of the length, width and height of the shoe and in addition the angular disposition of the tool holder about said first and second axes relative to the side wall portion of such shoe in respect of each such point.

23. Machine according to claim 14 wherein the tool is a radial wire brush.

24. Machine according to claim 14 wherein the tool comprises an abrasive-covered wheel.

25. Machine according to claim 14 wherein the tool comprises two spaced-apart discs and, extending therebetween, a plurality of pins on each of which a roughing device is loosely mounted.

26. Machine according to claim 25 wherein each roughing device comprises a roll having a knurled or serrated operating surface.

27. Machine according to claim 25 wherein each roughing device comprises one or more plate-like elements having a roughing edge by which the shoe upper is engaged in a flail-like action as the tool is caused to rotate.

28. Machine according to claim 14 comprising means, including a reversible motor, for effecting rotation of the tool.

* * * * *